May 30, 1950  W. S. ZIMMERMAN  2,509,405
SCORING DEVICE
Filed March 1, 1948

INVENTOR.
WAYNE S. ZIMMERMAN
BY HIS ATTORNEYS.
HARRIS, KIECH, FOSTER & HARRIS
BY

Patented May 30, 1950

2,509,405

UNITED STATES PATENT OFFICE 2,509,405

SCORING DEVICE

Wayne S. Zimmerman, Walnut Park, Calif.

Application March 1, 1948, Serial No. 12,209

16 Claims. (Cl. 35—9)

This invention relates to a method of and means for facilitating the administration of psychological and other tests and computing the score or grade of an examinee taking such examination.

During the administration of various examinations such as tests dealing with the aptitude, achievement, personality, and interest of a person, it is the common practice to provide a test sheet or booklet upon which selected questions are usually printed. Alongside each question is a series of choice answers, any one of which the examinee may check with a pencil to denote his preference. In other cases a separate answer sheet may have a plurality of answer spaces, each of which is usually designated by an alphabetical or numerical character corresponding with the the alphabetically or numerically designated permissible answers so labeled in the test booklet, the spaces being adapted to be filled in by the lead of a pencil. After an examinee has completed the test, the examination sheet is scored either by the examiner or in a machine especially designed for this purpose. Computing the scores or grades of examination papers of a relatively large group of examinees involves a laborious and tedious task if scored manually and for this reason there is an ever-present possibility that errors may be made during such computation. On the other hand, when the scores are to be computed mechanically, a complicated and expensive machine is required. In any event, it is necessary to collect the individual test sheets or booklets or answer cards for assembling and subsequent scoring, and there is a considerable delay between the taking of the examination and the scoring operation.

It is a principal object of this invention to provide a method of and means for simplifying the administration of tests and computing the score attained by an examinee.

This object is best attained by providing an answer sheet having a plurality of pre-punched discs, each disc representing a possible choice answer of the examinee and adapted to be selectively separated from the sheet by the examinee. Preferably, the discs designate correct and incorrect or appropriate and inappropriate answers.

It is another object of the invention to provide means for automatically segregating the punched correct or appropriate answer discs from those representing incorrect or inappropriate answers so that the number or percentage of correct or appropriate answers selected by an examinee can be readily ascertained. It is a further object in this respect to provide means whereby the correct or appropriate answer discs punched from the answer sheet and separated from the incorrect answer discs are stacked, one upon another, so that the total number of correct discs can be readily determined.

The foregoing objects are achieved, according to the invention, by providing a tray-like receptacle having means for supporting the "punchboard" type answer sheet or card, the card serving as a closure for the holder. In accordance with a preferred embodiment of the invention, the tray-like holder is provided with spaced ribs or partitions on the upper surface of its bottom wall, the ribs defining between them a channel of a width substantially equal to the width or diameter of the discs of the answer sheet. The channel is preferably irregular in outline, that is, it deviates from a straight line, and for this reason it underlies certain of the discs of the answer card but is displaced with respect to the other discs. Stated another way, the channel underlies only those discs which represent correct or appropriate answers so that when these discs are punched and expelled in a downward direction they are received in the channel, discs designating incorrect or inappropriate answers and punched from the answer card falling into the tray at either side of the channel.

By the construction described generally above, the discs representing the correct answers and punched from the answer sheet are automatically separated from the punched discs designating incorrect answers. An indicated above, it is desirable that the total number of correct answers to the several questions be readily obtainable so that the score or grade of the examinee can be quickly and accurately determined. By the use of the present scoring device, such score or grade is conveniently and accurately determinable, it being only necessary to tilt the tray-like receptacle following the completion of the test, so as to cause the correct answer discs contained in the channel or channels to roll or slide downwardly in the channels and come to rest in stacked relationship at the lower end of the channels. The height of the stack may be indicated by a scale provided within the tray adjacent the lower end of the channel so that the score or grade attained by the examinee is automatically computed and registered and this is another important object of my invention.

Another object of the present invention is to provide a method of administering psychological and other tests and computing the scores of such tests which may be carried out systematically and expeditiously with a minimum of equipment and without necessitating computation of the scores by the examiner.

A still further object is to provide a device for facilitating such a method, the device being especially simple in construction, of a light-weight, portable type capable of being stored in a small space, one which is adapted for economical mass production methods of manufacture, and which may be readily designed to meet the various requirements.

Further objects of my invention will be apparent from the following description and from the drawing, which is intended for the purpose of illustration only, and in which.

Figure 1:
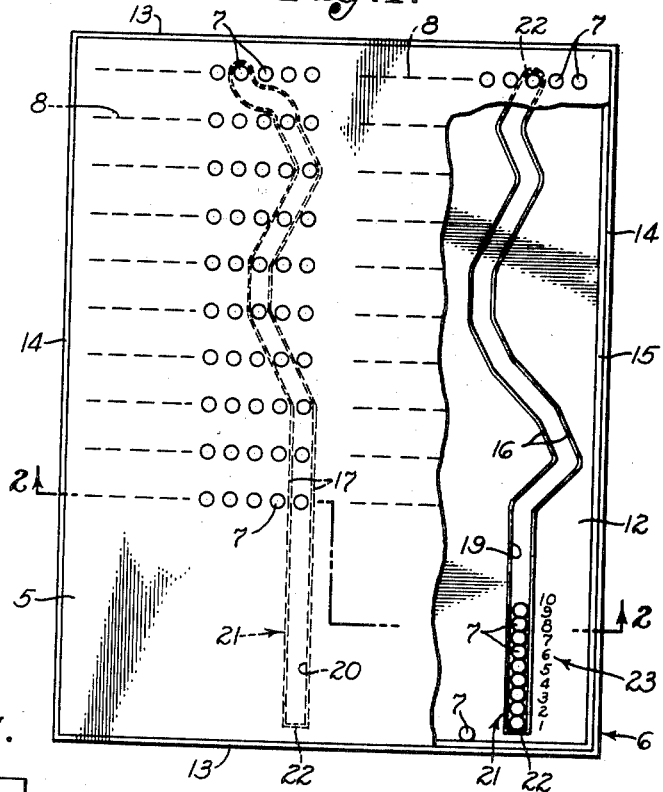
Fig. 1 is a plan view of a test score computing device for use in carrying out the improved method of administering examinations, a typical question-and-answer sheet being shown as applied to use with the device.

The device for carrying out the improved method consists essentially of two elements, namely, an answer sheet or card 5 and a holder member 6 for supporting the card. The sheet 5, which is used by an examinee to register his or her answers to selected questions, consists merely of a sheet of cardboard having a plurality of partially punched portions defining discs 7 capable of being completely punched and expelled from the sheet by pressure exerted thereagainst by the end of a pencil or the like held in the hand of the examinee. The "punch-board" type of answer sheet is susceptible of various designs and may be printed or otherwise made to include indicia designating both questions and answers, or only answers to questions printed on a separate sheet or on pages of an examination booklet which the examinee consults during the taking of the test. A sheet 5 of the first-mentioned type is shown in Fig. 1 of the drawing, the questions being indicated at 8 and illustrated as arranged in two vertical rows. It will be apparent, however, that a lesser or greater number of rows of the questions may be printed on the examination sheet 5 and the questions of each row may relate to the same or to different subjects. For example, the questions listed in the left-hand row or column shown in Fig. 1 may relate to one aspect of personality while the questions of the right-hand row might pertain to a different trait of personality. If preferred, the card 5 may have only rows of the partially punched discs 7, each row of discs in each column representing possible answers to questions presented on a separate sheet or leaf of a question booklet. In any event, each disc of a group of discs represents a possible answer to a particular question and to record his response to that question, the examinee merely punches one of these discs from the sheet 5 by pressing the end of his pencil or other object thereagainst. It is within the concept of this invention to provide a translucent paper on which the questions are printed, this paper being adapted to be placed upon the answer sheet 5 with its questions disposed adjacent the rows of answer discs. In this case, the answer sheet would be devoid of any printing. When such means is provided, a pencil may be pushed through the paper into engagement with the particular disc to be displaced from the answer card.

As will be apparent from the foregoing, each disc 7 of the individual vertically-spaced rows of discs represents a choice response to a particular selected question and only one of these discs is indicative of the correct or appropriate answer. An examination of the punched card will therefore indicate to the examiner which of the questions propounded have been correctly and incorrectly answered by the person taking the test. Such procedure is comparable to that of determining the grade denoted by check marks made in "yes" and "no" boxes or otherwise designated on conventional test sheets. This conventional method of determining the grade or score of the examinee has certain disadvantages, one of which is that the rows of answers must be examined individually and this consumes considerable time and involves a tedious procedure. Moreover, the possibility of error in computing the total score is ever present so that the correct grade is not always determined.

Figure 2:
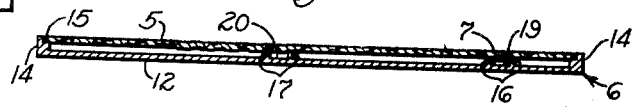
Fig. 2 is a cross-sectional view, taken on line 2—2 of Fig. 1.

It is an aim of the present invention to avoid the difficulties and disadvantages outlined above by providing means for automatically computing the score or grade attained by an examiner using an answer card of the general type disclosed in Fig. 1 of the drawing. The computing means is embodied in the holder member 6 previously referred to. As shown in Figs. 1 and 2, the holder member 6 consists of a shallow rectangular tray having a bottom 12, upstanding end walls 13, and side walls 14. The end walls 13 and side walls 14 are recessed at their upper inner corners so as to provide a continuous shelf or ledge 15 upon which the perimetric portion or rim of the answer card 5 is adapted to rest as herein shown. If desirable, suitable projections such as bosses or strips may be provided within the tray for supporting the mid-portion of the card 15, such bosses not being shown in the drawing.

Projecting upwardly from the bottom 12 of the tray-like holder 6 are two pairs of relatively narrow ribs 16 and 17, these ribs extending generally lengthwise of the holder. The ribs 16 or 17 of each pair are arranged in parallelism and are preferably, although not necessarily, irregular in outline. That is to say, the ribs follow any selected irregular pattern and define between them and with the bottom 12 of the tray 6 respective guides or channels 19 and 20. The channels 19 and 20 are made slightly wider and deeper than the diameter and thickness of a disc 7 so as to receive the discs punched from the card 5. It will be noted that the channel 19 extends beneath the right-hand column of discs 7 while the other channel 20 lies beneath the left-hand column of discs 7. Each channel 19 or 20 is provided with an end portion 21 which may be straight, it being observed that the ends of each channel are closed by cross strips 22.

It will be observed, by reference to Fig. 1, that each channel 19 or 20 is so shaped that it follows a path which underlies the disc 7 of each row of discs which represents the correct or appropriate answer to a particular question so that when each correct answer disc is punched it falls directly into the channel 19 or 20, as the case may be. Since the channels 19 and 20 are limited in width to substantially that of the diameter of a disc, it follows that only those discs which denote correct answers are receivable in the channels, any other disc punched from the answer sheet falling outside the confines of the channels and being received in areas of the holder 6 disposed at the sides of the channels.

After an examinee has completed the punching of selected discs 7 from the answer card 6, the examiner, or examinee, tilts the entire device, including the answer card, in one or more directions to cause the correct answer discs located in the channels 19 and 20 to move downwardly in the channels and to come to rest in the straight portions 21 in stacked relationship as shown at the right in Fig. 1. The answer card 5 is subsequently removed from the holder 6 and the number of discs 7 which are stacked within the straight portion is noted on a calibrated scale, to be later described, so that the score or grade is readily established.

In order to facilitate the counting of the discs disposed in the end portions 21 of the channels 19 and 20, a scale 23 is preferably inscribed adjacent each end portion, said scale having graduations corresponding in number to the number of rows of answer discs under which the particular channel extends. By observing the graduation opposite the uppermost correct answer disc in the stack, the score is, in effect, automatically computed and immediately ascertained and this conserves time and effort on the part of the examiner.

In a device adapted for use with a card 5 having a series of ten answers in each of its vertical rows, as shown in Fig. 1, the scale 23 has ten calibrations and, assuming that the scale indicates the presence of nine discs 7 in the portion 21 of the channel 19, the examiner is informed that the examinee has attained a score of nine or a grade of ninety percent. Following the determination of the score, the holder or receptacle 6 is inverted to permit the correct answer discs in the channels 19 and 20 and any incorrect answer discs within the tray to fall out of the device so that the holder may be utilized in another test. The over-all thickness of the holder 6 is relatively small so that it occupies a minimum space when stacked, one upon another, between tests. Moreover, as will be apparent, the holder 6 is particularly adapted for fabrication from light-weight metal or manufacture from plastic material by a molding process so that low cost of the article is effected.

While the device has been described in connection with psychological and other test scoring, it will be apparent that the card 5 and holder 6 may serve other purposes not heretofore mentioned. For example, the basic concept may be employed in so-called "quiz" games wherein a contestant selects and punches discs representing his choice of answers to predetermined questions, the "true" discs falling into the channels 19 or 20 to be automatically counted when the device is tilted in the manner previously explained.

Figure 3:
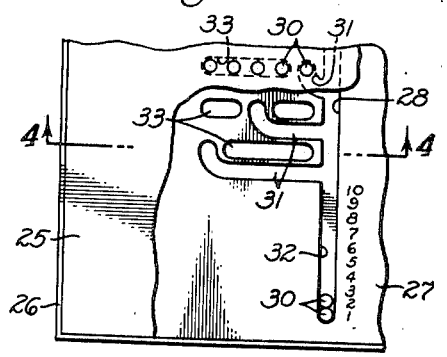
Fig. 3 is a fragmentary plan view of a score computing device of modified construction.
Figure 4:
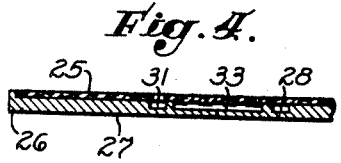
Fig. 4 is a cross-sectional view, taken on line 4—4 of Fig. 3.

Figs. 3 and 4 illustrate a test scoring device wherein the answer card 25 is insertable into the tray-like holder 26 and adapted to rest upon the bottom wall 27 thereof. In this alternative structure, the bottom wall 27 is provided with a longitudinal groove or main channel 28 arranged to extend alongside a column of the rows of partially punched discs 30 of the card 25. Also formed in the bottom wall 27 are branch channels 31 which communicate with the main channel 28 and whose outer ends underlie discs 30 which represent correct or appropriate answers to permit these discs, when punched, to enter the main channel and to roll or slide to the end 32 thereof when the holder is inclined. Underlying those discs which designate incorrect or inappropriate answers are recesses 33 formed in the bottom wall 27. By this construction, the discs 30 punched from the answer card 25 are automatically separated, the discs representing correct or true answers falling into the branch channels 31 while those indicating incorrect or untrue answers are received in the recesses 33.

As thus far described, the method and means outlined herein enable the examiner to determine the total score or grade attained by the examinee. It may be desirable, however, to ascertain the examinee's responses to the individual questions and in such case it is only necessary to inspect the card from which the answer discs were punched to quickly determine the choice answer to each question. An appropriate stencil having an opening which follows the same outline as the channel of the holder may be employed, if desired, to facilitate such inspection.

It will be observed from the foregoing that the present invention provides a method of and means for administering examinations or tests of various types and ascertaining the total score or grade attained by a person taking the test. The method involves a minimum number of extremely simple steps which are easily understood and executed and the device employed for carrying out the method is simple in construction and efficient in operation. The computing device is adapted for use wherever counting is usually necessary but its specific adaptation to test scoring has been emphasized herein since it is highly useful in this field, it being apparent that by the use of the improved device separate total scores for each of several tests covering various subjects are readily obtained. For this reason, it is unnecessary to collect test booklets or answer sheets for assembling and subsequent scoring, either manually or mechanically, and thus a material saving in time and effort is achieved and a more systematic test procedure obtained.

The answer cards used in the system are expendable following the completion of a test so that a new card is required for each examination. The tray-like holder, on the other hand, can be used indefinitely. The answer cards are printed especially for each type of examination although certain standard designs may be used for adaptable tests and the positions of the partially punched discs may be standardized. If desired, the method can be carried out by using a test booklet in which the pages have partially punched discs and are adapted to be placed upon the score-computing tray. A separate tray is required for each person of a group taking a test at the same time. It will be obvious that the computer trays require specially designed channels for many types of tests although standard trays may be employed and the test sheets adapted to them. For this reason, it is especially easy for teachers conducting achievement tests to arrange the items so that the pattern of correct answers conforms to the standard channel design.

In the foregoing description, reference has been made to "partially-punched" and "pre-punched" discs, the former term being intended to include discs which are merely outlined on the card by circular scoring which extends only partially through the answer card. The latter term may designate discs which have been punched completely from the card and re-inserted in the apertures to adapt them for easy separation from the card during the taking of the test.

Figure 5:
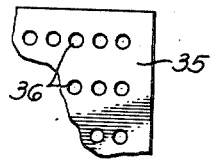
Fig. 5 is a fragmentary plan view of an answer card of alternative form.

While the discs provide a simple and inexpensive means for registering the choice answers of an examinee, it is within the concept of the present invention to provide other counter pieces in lieu of the discs. For example, it will be apparent that small balls, or the like, can be embedded in the card, such balls being readily separated from the card by pressure exerted thereagainst by the examinee so as to deposit them in a channel of the computing device. In another embodiment, an answer card 35, such as that illustrated in Fig. 5, may be provided with holes 36 through which shot, balls or other objects can be dropped or discharged singly from a pencil-like dispensing device into selected channels of the computer to record the choice answers of the examinee.

While I have herein set forth the improved method of conducting tests as including specific steps and described the device as embodied in two typical forms of construction, by way of example, it will be apparent that various changes might be made in the method and means, all within the spirit and the scope of my invention. Consequently, I do not wish to be limited in this respect but desire to be afforded the full scope of the appended claims.

I claim as my invention:

1. A test score computing device, comprising: a receptacle member having walls defining a channel; and a sheet detachably mounted on said receptacle member and including objects capable of being separated from said sheet, said objects representing choice answers to selected questions, certain of said objects separated from said sheet being receivable in said channel.

2. A test score computing device, comprising: a tray-like receptacle member; and a test sheet detachably mounted on said receptacle member and including discs capable of being separated from said sheet, said discs representing multiple choice answers to selected questions, certain of said discs separated from said sheet being receivable in said receptacle member.

3. A test score computing device, comprising: a tray-like receptacle member having walls dividing its interior into a compartment and a channel; and a test sheet detachably mounted on said receptacle member and having partially punched discs capable of being completely punched and ejected from said sheet, said discs designating correct and incorrect answers to predetermined questions, the discs representing correct answers being disposed above and receivable in said channel when punched from said sheet, and the discs representing incorrect answers being disposed above and receivable in said compartment when punched from said sheet.

4. A test score computing device, comprising: a tray-like receptacle member having partitions therein defining an open channel and an open compartment at the side of said channel; and a test sheet detachably mounted on said receptacle member so as to close said compartment and said channel, said sheet having partially punched discs capable of being completely punched and ejected from said sheet, said discs designating correct and incorrect answers to predetermined questions, the discs representing correct answers being disposed directly above and receivable in said channel when ejected downwardly from said sheet, and the discs representing incorrect answers being disposed above and receivable in said compartment when ejected downwardly from said sheet, so that the number of questions correctly answered is determinable and the score readily computed.

5. A test score computing device as defined in claim 4 in which said channel is of irregular outline.

6. A test score computing device as defined in claim 4 in which the discs of said test sheet are arranged in rows, and in which said channel is of irregular outline and extends beneath preselected discs of each of said rows.

7. A test score computing device as defined in claim 4 in which said channel is so dimensioned that discs received therein can move therein, lengthwise of said channel, so that inclination of said holder member causes said discs to move to one end of said channel in stacked relationship.

8. A test score computing device as defined in claim 7 in which said holder member is provided with indicia alongside said one end of said channel to indicate the number of discs moved to and stacked in said one end so as to facilitate determination of the score attained by an examinee using said test sheet.

9. A test score computing device as defined in claim 2 in which said receptacle member is provided with ledges upon which said test sheet rests.

10. A test scoring device for use with a test sheet having displaceable discs representing appropriate and inappropriate answers to predetermined questions, consisting of: a tray-like receptacle member for supporting the test sheet and having upstanding, integral walls defining a channel therein, said channel underlying the discs designating appropriate answers and adapted to receive the same when displaced downwardly from the test sheet.

11. A test scoring device for use with a test sheet having displaceable pre-punched discs representing appropriate and inappropriate answers to predetermined questions, consisting of: a tray-like receptacle member having upstanding, perimetrical walls provided with ledges for supporting the test sheet and integral, upstanding partitions defining a channel underlying the discs designating appropriate answers and adapted to receive the same when displaced downwardly from the test sheet.

12. A test scoring device for use with a test sheet having displaceable pre-punched discs representing appropriate and inappropriate answers to predetermined questions, consisting of: a tray-like receptacle member having upstanding perimetrical walls provided with ledges for supporting the test sheet and integral upstanding partitions defining a channel of irregular shape underlying the discs designating appropriate answers and adapted to receive the same when displaced downwardly from the test sheet, said partitions also supporting the test sheet.

13. A device as defined in claim 12 in which said channel is dimensioned to allow discs received therein to slide therein when said receptacle member is inclined.

14. A device as defined in claim 13 in which said channel has a closed end, said discs received in said channel sliding to said closed end in stacked relationship when said receptacle member is inclined.

15. A device as defined in claim 14 in which said receptacle member has a calibrated scale disposed adjacent said closed end for indicating the number of discs so stacked.

16. A test score computing device, comprising: a receptacle member having integral, upstanding walls defining a channel; and a sheet detachably mounted on said receptacle member and provided with apertures through which objects can be passed into said receptacle member, said channel underlying certain of said apertures to adapt it to receive objects passed through the same.

WAYNE S. ZIMMERMAN.

REFERENCES CITED

The following references are of record in the file of this patent:

UNITED STATES PATENTS

| Number | Name | Date |
|---|---|---|
| 1,842,470 | Brownlee | Jan. 26, 1932 |
| 2,066,818 | Beal | Jan. 5, 1937 |
| 2,311,217 | Emmert | Feb. 16, 1943 |